United States Patent [19]

Mesnik

[11] 3,748,651

[45] July 24, 1973

[54] REFRESH CONTROL FOR ADD-ON SEMICONDUCTOR MEMORY

[75] Inventor: Robert F. Mesnik, Yorktown Heights, N.Y.

[73] Assignee: Cogar Corporation, Wappingers Falls, N.Y.

[22] Filed: Feb. 16, 1972

[21] Appl. No.: 226,665

[52] U.S. Cl.... 340/173 R, 340/172.5, 340/173 CA, 340/173 DR

[51] Int. Cl. .......... G11c 11/00

[58] Field of Search .......... 340/173 R, 172.5, 340/173 CA

[56] References Cited

UNITED STATES PATENTS 3,541,530 11/1970 Spampinato .......... 340/173 DR 3,576,571 4/1971 Booher .......... 340/173 DR

*Primary Examiner*—Terrell W. Fears

*Attorney*—Harry M. Weiss et al.

[57] ABSTRACT

A circuit for controlling refresh operations of a dynamic MOS add-on memory. The need for a refresh operation is determined by a 4.5-microsecond clock. If the memory has not been selected in the recent past, in response to the clock signal a separate refresh cycle is initiated. If a read or write cycle is in progress when the clock signal is generated, a separate refresh cycle is executed a predetermined time after the termination of the read or write cycle. If a separate refresh operation is interrupted by a command to execute a read or write cycle, then the memory is operated in a mode in which it is automatically refreshed at the end of the read or write cycle.

10 Claims, 9 Drawing Figures

SEPARATE ASYNCHRONOUS REFRESH (CASE 2) (MODE = –)

SEPARATE ASYCHRONOUS REFRESH (REFRESH INTERRUPTION)

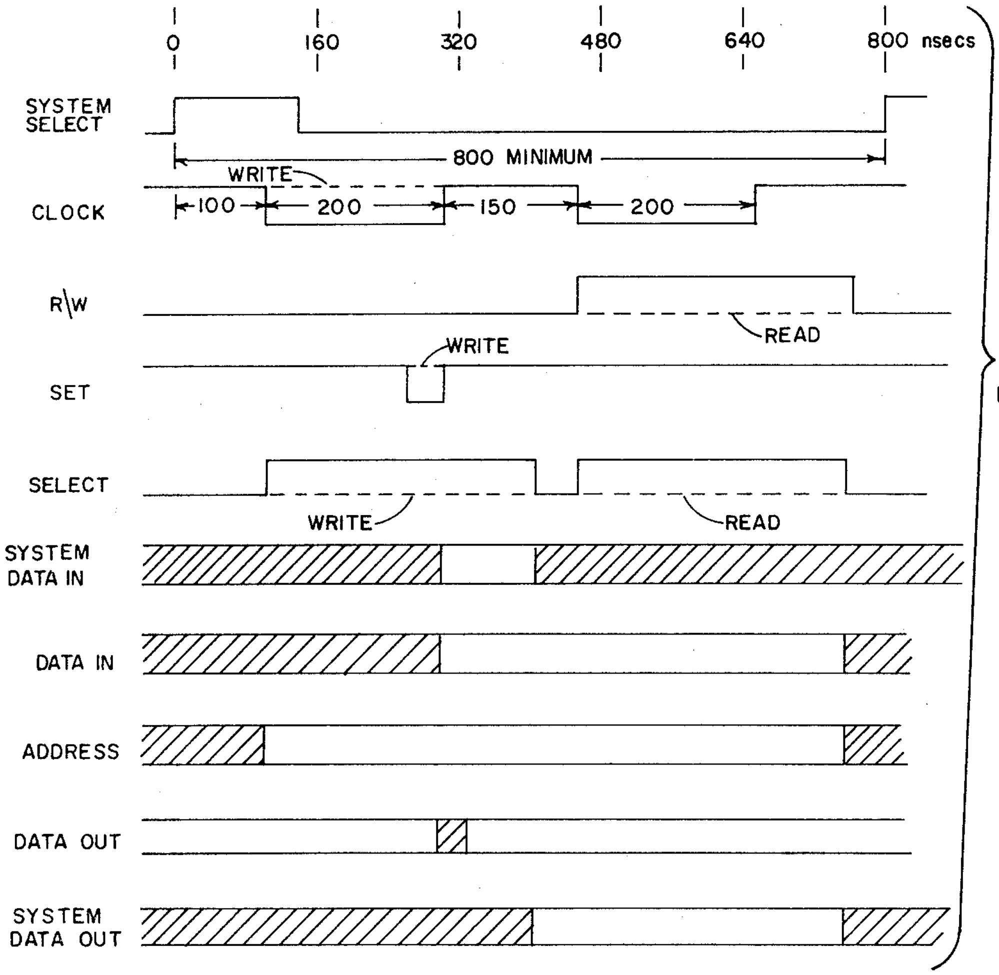
FIG. 6 INTERFACE SIGNALS
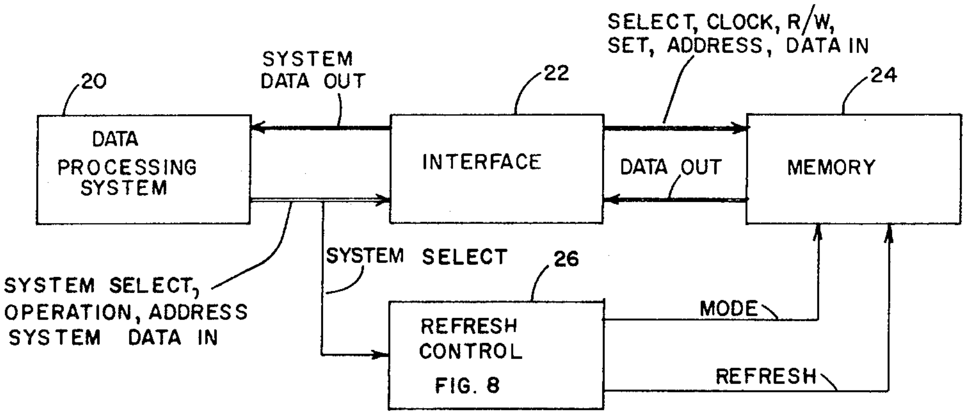
FIG. 5

REFRESH CONTROL FOR ADD-ON SEMICONDUCTOR MEMORY

This invention relates to refresh control for semiconductor memories, and more particularly to refresh control for add-on semiconductor memories.

The design of MOSFET (metal-oxide-semiconductor field-effect transistor) memories (hereinafter referred to as MOS memories) has taken two approaches. In the case of static MOS cell arrays, each cell is generally a cross-coupled flip-flop in which two additional MOS devices are utilized as load "resistors" and another two MOS devices gate the cell nodes to the bit lines. The sequence of functions performed on each chip during a read or write cycle is similar to that performed on a bipolar memory chip. Dynamic MOS cells, on the other hand, are not provided with load "resistors." One of the two nodes in each cell is charged by logic transistors; the capacitance at the node then holds the voltage. Because leakage currents do exist, however, "refresh" signals must be applied to the cells periodically. Dynamic MOS memory arrays offer the advantages of greater speed and reduced chip areas. An improved dynamic MOS memory chip is disclosed in Allen et al. application Ser. No. 65,197, filed on Aug. 19, 1970 now U.S. Pat. No. 3,685,037.

While the cycle time of a dynamic MOS memory may be in the order of several hundred nanoseconds, it is not necessary to refresh the memory during every cycle; instead, it may be sufficient to refresh the memory at intervals of several microseconds. As a result, there are several different modes in which a dynamic MOS memory may be operated. For example, it is possible to refresh the memory during every one of successive memory cycles even though refreshing at such a rapid rate is not necessary. The advantage of this approach is that the refreshing operation can be "automatic" in that it is a part of every system cycle, and therefore it may not be necessary to provide external timing circuits for determining when refresh operations should take place. However, the length of each memory cycle is necessarily increased because of the additional refreshing step which is made a part of each cycle. On the other hand, at the expense of additional timing circuits, it is possible to refresh the memory only periodically, at intervals separated by several microseconds. This allows all of the nonrefresh cycles to be short. These several concepts are discussed in greater detail in Andersen et al application Ser. No. 65,225, filed on Aug. 19, 1970 now U.S. Pat. No. 3,684,397.

There are also several different modes in which a memory system can be operated even when the refresh operation does not take place during every cycle. For example, it is possible to allocate the same time period for a refresh operation as for a read or write operation, and to accomplish the refresh function during one of the system cycles; during a refresh cycle a read or write operation is not performed. On the other hand, it is possible, when it is necessary to perform a refresh operation, to lengthen a read or write cycle and to refresh the memory at the end of the cycle.

Semiconductor memories of the type described are generally self-contained units. The mode in which a memory is operated and the particular times when refresh operations take place are usually controlled by external signals applied to the memory system. Of course, it is necessary that whatever signals are applied to the memory for refresh purposes occur at predetermined times relative to the other signals which are applied to the memory for controlling the read and write functions. Typically, these other signals include address bits, data bits, a read or write command, and various clock and control signals.

When a data processing system in which an MOS dynamic memory is used is first designed, the mode in which the memory is to be operated can be determined and the overall system timing can be selected such that the memory is refreshed at the required intervals. A completely different situation exists, however, when an attempt is made to add a self-contained memory system to an already existing data processing system. The timing of the data processor may not be compatible with the memory timing. For example, there may be no signals available at outputs of the data processing system which can be extended to the memory for controlling the refresh operation. And if the timing of the refresh operation is made independent of the data processing system, the two systems may not be able to work with each other; the memory may attempt a refresh cycle at the very moment when the data processing system attempts to perform a read or write operation. It has been recognized that when any particular memory is to be used as an add-on memory for an already existing data processing system, an interface must be employed. But there are no simple solutions to the problems encountered in designing refresh control circuits for the memory without making the memory and the data processing system incompatible with each.

It is a general object of my invention to provide refresh control for an "add-on" dynamic MOS memory.

The illustrative embodiment of the invention pertains to the use of the "Cost Performance Read/Write Memory" marketed by Cogar Corporation and the IBM System 360, the Cogar memory being used as an add-on unit for an IBM data processing system. The data processor initiates a read or write operation with the generation of a "system select" signal. This signal is transmitted to an interface unit which bridges the data processing system and the memory. Along with the system select signal, the data processor provides an operation code, an address, and data in the event a word is to be written in the memory. The interface unit supplies to the memory all signals except those which control the refresh function. The signals supplied include select signals, clock pulses, read and/or write operation codes, set pulses, address bits and data bits. The memory, in turn, in the case of a read operation, extends a data word to the interface which then supplies it to the data processor. The interface functions to accept signals from either the data processor or the memory, and to extend them (together with internally generated signals) to the other unit. The interface itself is of straightforward design; conventional pulse generators with appropriate delay settings can utilized for the purpose.

A separate refresh control circuit is also provided. (Actually, the refresh control circuit is part of the overall "interface" but is most conveniently considered as a separate circuit.) The only input to the refresh control circuit is the IBM "system select" pulse. There are two outputs from the refresh control circuit which are extended to the memory — the "mode" and "refresh" signals which are required by the memory for refresh purposes. All refresh operations are geared to the occurrences of "system select" pulses from the data processor. The pulses are always separated by at least 800 nanoseconds — a design feature of the data processor.

The Cogar memory can operate in several different modes. If the "mode" input is high and the "refresh" input is low, the memory operates in the automatic refresh mode. A refresh operation takes place at the end of every read or write cycle. When operated in the automatic mode, the memory is relatively slow and each cycle requires 400 nanoseconds.

If the "mode" signal is low, the memory is operated in the separate refresh mode. A refresh operation does not take place during every cycle and a read or write cycle requires only 350 nanoseconds. When operated in the separate refresh mode, the Cogar memory can function in a "synchronous" or an "asynchronous" fashion as described in the literature published by Cogar Corporation in connection with its memory systems. In a synchronous application, the memory cycles follow each other every 350 nanoseconds; in each cycle a read or write operation is performed, or a refresh operation is performed. Thus a refresh operation is treated just as is a read or write operation, and it requires a full cycle. In an asynchronous application, the system cycles do not necessarily follow one after another. It is possible to perform a read or write operation during a cycle in which there is no refresh function, to perform a read or write operation together with a refresh operation during a longer cycle, or even to perform a refresh operation by itself.

In accordance with the principles of the invention, the memory is operated in the separate refresh mode, in asynchronous fashion. A counter is provided to generate a signal every 4.5 microseconds to indicate that a refresh operation is necessary. If the memory has not been selected in the recent past for performing a read or write operation, a separate refresh cycle takes place. If the data processor transmits a "system select" signal during the separate refresh operation, the refresh operation is immediately terminated, and a read or write cycle takes place. At the end of the read or write operation the memory is refreshed; it is operated in the automatic mode. On the other hand, if the memory is in the midst of a read or write cycle when the counter indicates that it is time to perform the refresh function, after a predetermined delay following the end of the cycle in progress a separate refresh cycle is made to occur.

The following "rules" summarize the timing of the refresh operations:

1. If the memory has not been selected in the recent past (the duration of the "recent past" will become apparent below) when the 4.5 microsecond clock indicates that a refresh operation is necessary, a separate refresh cycle is initiated.

2. If the separate refresh operation is then interrupted by the receipt of a "system select" pulse, the memory is operated in the automatic mode — at the end of the read or write cycle the memory is automatically refreshed.

3. If a read or write cycle is in the progress or has just terminated when the 4.5-microsecond clock determines that it is time to refresh the memory, the system waits for a predetermined time interval after the termination of the cycle (which time interval is a timing requirement of the memory) and then executes a separate refresh cycle.

This timing sequency enables the refresh control circuit to cause the memory to refresh itself as required without in any way interfering with the operation of the memory as required by the data processor. The data processor "system select" pulse is used to inform the refresh control circuit of the state of the data processor, and the refresh control circuit utilizes this information to determine when a refresh operation should be performed. The three "rules" allow both the data processor and the memory to function correctly for the following reasons. A read or write cycle should not be interrupted or delayed because this would not allow the data processor to function properly. Thus the read and write operations, initiated by the "system select" pulses, take precedence over the refresh function. (The 4.5-microsecond clock period is selected because it is shorter than the maximum permissible time separation between refresh pulses by more than any possible delay in the refresh function as a result of a read or write operation which has priority.) If the separate refresh operation is interrupted, it is necessarily interrupted prior to the start of a read or write cycle; an automatic cycle can take place since it is known prior to the start of the cycle that a refresh operation should occur at the end of the cycle. On the other hand, if a read or write operation is in progress when a 4.5-microsecond clock signal is generated, the memory cannot switch to the "automatic" mode in the middle of the cycle. For this reason, a separate refresh operation is caused to occur after the read or write operation in progress has terminated. The 800-nanosecond minimum spacing between "system select" pulses, together with the memory timing intervals when operated in the several different modes, ensures that the memory is always refreshed at intervals shorter than the maximum permissible interval (6.5 microseconds) between refresh functions.

Further objects, features and advantages of the invention will become apparent upon consideration of the following detailed description in conjunction with the drawing, in which:

FIG. 5 is a block diagram schematic of the manner in which the refresh control circuit of the invention can be utilized in an overall system;

FIG. 6 depicts the signals which are generated by interface unit 22 of FIG. 5;

Figures 1, 2:
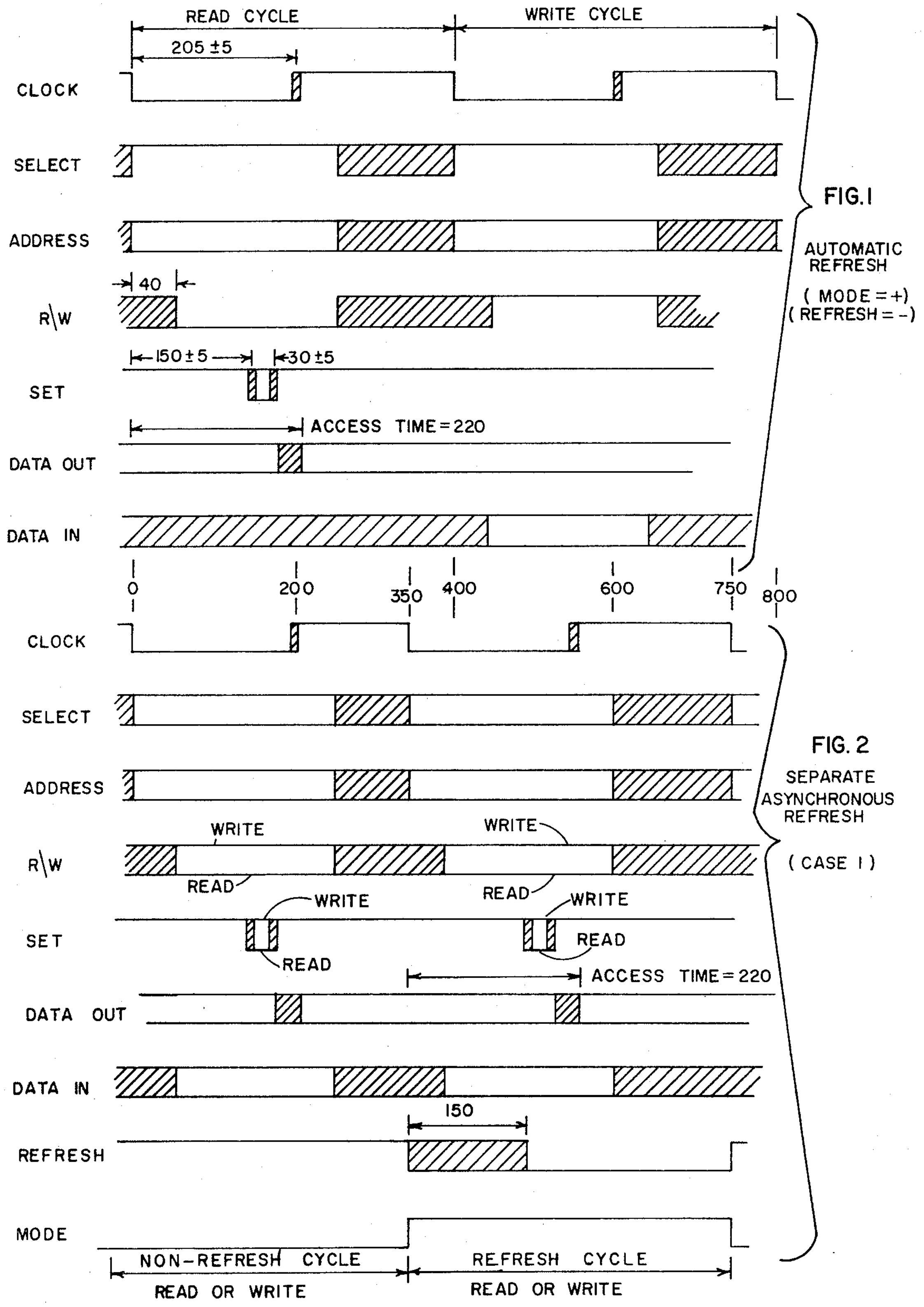
FIG. 1 depicts the timing of the memory when operated in the automatic refresh mode.
FIGS. 2 and 3 depict the timing of the memory when operated in the separate refresh mode, in an asynchronous application.

FIG. 1 depicts the signals which are transmitted to and from the memory when it is operated in the automatic refresh mode. The MODE conductor is held at a high potential and the REFRESH conductor is held at a low potential when the system is operated in the automatic mode. Each read or write cycle requires 400 nanoseconds and a refresh operation is performed automatically at the end of each cycle. The shaded areas in the waveforms shown in the drawing represent "don't care" time intervals, that is, whether a signal is high or low during a "shaded" interval is unimportant.

It is a negative clock signal which initiates each cycle. The SELECT conductor goes high at the same time, the width of the SELECT pulse being slightly larger than that of the negative CLOCK pulse. ADDRESS signals are extended to the memory during the time that the SELECT conductor is high. For a read operation, the read/write (R/W) conductor must go low no later than 40 nanoseconds after the start of a cycle; similarly, to control a write operation the R/W conductor must go high no later than 40 nanoseconds after the start of a cycle. In the case of a write operation, the DATA IN conductors must have appropriate bit signals on them while the R/W conductor is high. In the case of a read operation, a negative SET pulse is required to reset the output latches of the memory, and the data word being read appears on the DATA OUT lines of the memory no later than 220 nanoseconds (the "access" time) after the start of the cycle. In the automatic refresh mode, the MODE and REFRESH conductors are held at fixed potentials; consequently, no waveforms are shown for these conductors. The memory is automatically refreshed at the end of each read or write cycle.

When the system is operated in the separate refresh mode, the cycling can take several different forms. Although not shown in the drawing, one such form occurs in synchronous applications. The MODE conductor is held at a low level at all times. The REFRESH conductor is normally high, but it is made to go low prior to the start of a refresh cycle. There are three types of cycle -- read, write and refresh. Each of the cycles is 350 nanoseconds in width, and one cycle always follows another. Although the read and write cycles are shorter than comparable cycles when the system is operated in the automatic mode, in order to refresh the system a complete cycle must be set aside for the purpose during which a read or write operation cannot be performed. To accomplish the refresh function, the REFRESH conductor is made to go low toward the end of a read or write cycle and to remain low for approximately half of the refresh cycle. In a synchronous application, clock pulses always occur at 350-nanosecond intervals, whether or not a read, write or refresh operation is to take place.

In asynchronous applications, the MODE conductor is not necessarily held permanently at a low level. Instead, the signal levels of the MODE and REFRESH conductors can vary in several different ways. Nor do successive cycles have to follow immediately after each other. Although FIG. 2 shows two successive cycles, the second cycle could occur any time after the first. FIG. 2 shows a first cycle during which a read or write operation (without a refresh) takes place, and a second read or write cycle at the end of which the memory is refreshed. In the case of a non-refresh cycle, the cycle time is 350 nanoseconds. The R/W conductor is high to control a write operation, and low to control a read operation. The CLOCK, SELECT, ADDRESS, R/W, SET, DATA OUT and DATA IN signals which occur during the 350-nanosecond cycle have the timing relationships shown in FIG. 2. Since a refresh operation is not required, the MODE conductor is held low and the REFRESH conductor is held high.

In a read or write cycle during which a refresh operation is to be performed, the cycle width is 400 nanoseconds rather than 350 nanoseconds. The negative CLOCK pulse and all of the other signals except the REFRESH and MODE signals have the same timing relationships as in the case of a non-refresh cycle; the only difference is that at the end of the cycle the CLOCK conductor must remain high for an extra 50 nanoseconds to allow the refresh function. At the start of the cycle the MODE conductor goes high and it remains high for the duration of the cycle. The REFRESH conductor must go low within the first 150 nanoseconds of the cycle and it must remain low until the end of the cycle in order for the refresh operation to take place. The refresh operation is under control of the external circuits which energize the REFRESH and MODE conductors.

Figure 3:
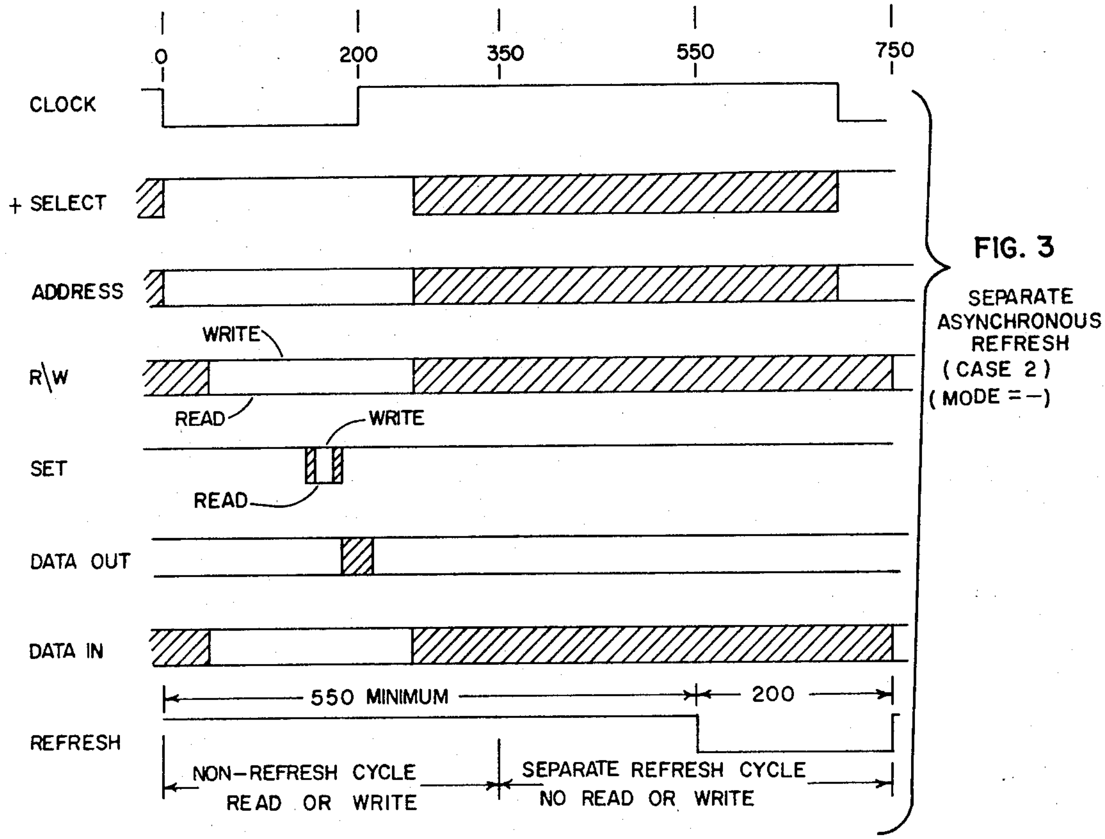

FIG. 3 depicts another synchronous case in which a separate cycle is provided for the refresh function, during which no read or write operation is performed. A first non-refresh cycle during which a read or write operation is performed is shown in the drawing, this cycle requiring the usual 350 nanoseconds. In order to refresh the memory during a separate cycle allotted for this purpose the MODE conductor may remain low. All that is required is for the REFRESH conductor to go low for 200 nanoseconds. However, there is one constraint which is imposed upon the external timing circuits, namely, the REFRESH conductor cannot go low until at least 550 nanoseconds after the last negative CLOCK pulse. Although the non-refresh cycle plus the separate refresh cycle of FIG. 3 together require 750 nanoseconds and thus require no less time than the two cycles of FIG. 2 (in both of which read or write operations are performed), it should be noted that in FIG. 3 the CLOCK conductor is shown as going low 50 nanoseconds prior to the end of the separate refresh cycle. At the same time, the SELECT conductor is shown as going high and address bits are extended to the memory. The R/W conductor, which must be high or low 40 nanoseconds after the start of the cycle, must be at the proper level 10 nanoseconds before the refresh cycle is completed. Because the CLOCK conductor can go low by as many as 50 nanoseconds prior to the end of the refresh cycle, the next cycle can actually start 50 nanoseconds earlier than it can in the case depicted in FIG. 2. Thus if after a first read or write cycle there is no need to perform immediately another read or write operation, and enough time has gone by since the last refresh function to dictate that another refresh operation take place, the execution of a separate refresh cycle allows the next read or write cycle to begin 50 nanoseconds earlier than would be possible were the refresh operation to be performed during the same cycle in which a read or write operation is performed.

Figure 4:
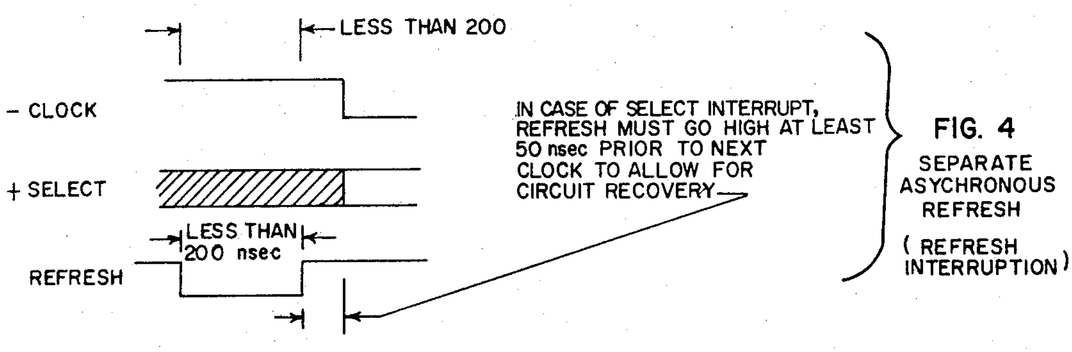
FIG. 4 depicts an additional timing requirement of the memory.

FIG. 4 depicts another timing requirement imposed by the memory. If an attempt is made to refresh the memory and in the middle of the refresh operation it is determined that a read or write operation must be performed, the refresh operation may be interrupted by having the REFRESH conductor go high. (Of course, the refresh operation should be interrupted only if the maximum permissable time period has not elapsed since the last refresh operation; otherwise, the data stored in the memory will be lost.) But it is not possible to perform a read or write operation as soon as the refresh operation is terminated. Instead, at least 50 nanoseconds must be allowed for the memory circuits to recover before the CLOCK conductor goes low and the SELECT signal goes high to initiate a new cycle. FIG. 4 shows the negative refresh pulse as being present for less than 200 nanoseconds, that is, it depicts an incomplete refresh operation. The next read or write cycle does not begin until 50 nanoseconds have elapsed after the interruption of the refresh operation.

It is thus seen that a typical dynamic MOS memory imposes many timing constraints insofar as the refresh operation is concerned. When an overall system which incorporates such a memory is first designed, it is possible to select a mode in which the memory is to be operated and to design the system timing accordingly. However, when it is attempted to utilize such a memory in an add-on capacity, the existing timing of the data processor may not permit the memory to be operated in an arbitrarily selected mode; this is especially true where the data processor provides a limited number of timing signals which can be utilized to control the refresh operation. A typical situation is that of the IBM System 360. Such a data processor provides a "system select" pulse when it is required to gain access to an add-on memory. The pulse is provided together with a read/-write command, an address, and data signals in the case of a write operation, but basically there is only one timing pulse — the "system select" pulse — which can be used to make the timing of the data processor and the memory compatible with each other. In the illustrative embodiment of the invention, a refresh control circuit is provided which allows the memory to be refreshed at proper intervals under control of only the IBM "system select" pulse.

FIG. 5 shows the overall arrangement of a data processor, interface and add-on memory. Data processing system 20 is connected by two cables to interface unit 22, which in turn is connected by two cables to memory 24. The data processor transmits to the interface unit a SYSTEM SELECT signal, together with an operation code, address bits, and data bits in the event a word is to be written in the memory. (In FIGS. 5 and 6, data transmitted to and from the data processor is referred to as "system data in" and "system data out", while data transmitted between the interface and the memory is referred to as "data in" and "data.") The interface unit 22 operates upon the signals received from the data processor and transmits to the memory those signals required for its operation. In all cases, select, clock and address signals are transmitted to the memory. If the read/write conductor goes low to indicate a read operation, a set pulse is also transmitted to the memory. If the read/write conductor goes high to indicate a write operation, data bits to be written into the memory are transmitted to it rather than a set pulse. In the case of a read operation, data bits are extended from the memory to the interface, and from the interface to the data processing system.

The design of a suitable interface is straightforward. All that is required is to convert signal levels and/or polarities, to adjust the timing of the signals relative to each other, and to generate clock and set pulses as required. FIG. 6 shows the signals which are transmitted between the two units by the interface circuit. The IBM SYSTEM SELECT pulse is approximately 135 nanoseconds in duration, and there is a minimum spacing of 800 nanoseconds between successive pulses. The data processor expects to receive data bits in the case of a read operation 320 nanoseconds after the start of the SYSTEM SELECT pulse. The interface is designed such that it controls a read operation, if one is to be performed, prior to a write operation, if one is to be performed. As shown in FIG. 6, the CLOCK signal extended to the memory goes low 100 nanoseconds after the start of the SYSTEM SELECT pulse — but only if a read operation is to be performed. (The data processor can also control a "test and set" cycle, during with both read and write operations are performed. The interface controls both operations simply by extending the signals required for both individual operations to the memory since the read and write operations take place during different parts of each overall cycle.) The CLOCK conductor stays low for 200 nanoseconds, and then goes high for 150 nanoseconds. It then goes low for 200 nanoseconds whether or not a write operation is to be performed.

The read/write signal extended to the memory by the interface is low during the first part of the cycle; but a read operation is performed only if the CLOCK signal is low at this time. The read/write conductor then goes high to control a write operation, but it goes high only if a write operation is to be performed.

The negative SET pulse required by the memory in the case of a read operation occurs during the first negative CLOCK pulse as in the case of any read operation. The SELECT signal extended to the memory consists of two positive pulses if both write and read operations are to be performed. The first pulse controls the read operation and the second controls the write operation. If one of the operations is not to be performed, the SELECT signal remains low in the indicated interval.

The data processor supplies data bits in the case of a word to be written into the memory at a time starting at 300 nanoseconds after the start of the SYSTEM SELECT pulse. This is shown in FIG. 6, and the interface extends the data bits to the memory at the same time. However, the interface extends the bits for a longer interval — until the end of the second SELECT pulse which controls the write operation in the memory.

The data processor also extends address bits to the interface, the interface receiving this information before 100 nanoseconds have elapsed after the start of the SYSTEM SELECT pulse. The interface extends the address bits to the memory for the entire interval starting at the beginning of the first SELECT pulse and ending with the trailing edge of the second SELECT pulse.

The memory, in the case of a read operation, provides signals representative of the data word which is read shortly after the CLOCK signal goes high during a read operation. Thus, data bits are avaialable approximately 320 nanoseconds after the start of the overall cycle. However, the data processor does not expect to receive such bits until 400 nanoseconds after the start of the cycle. As shown in the drawing, all that is required is for the interface to make sure that the SYSTEM DATA OUT signals are made available to the data processor within a short time after they are supplied by the memory, and to continue to make the data available to the data processor until 760 nanoseconds after the start of the overall cycle since that is the maximum time that the data is required by the data processor.

In general, the design of a suitable interface unit is a straightforward operation. Conventional pulse generators can be used for the purpose. Such pulse generators include controls for delaying the generation of pulses predetermined time intervals after trigger signals are received, with the width and polarity of each pulse also being adjustable. Consequently, if conventional pulse generators are used, all that is required is to adjust the settings in accordance with the timing waveforms of FIG. 6.

The interface unit 22 in FIG. 5 is suitable for making the timing of the data processor and the memory compatible with each other. However, it does not take into account the need to refresh the memory. Instead, a separate refresh control circuit 26 is provided for this purpose. The only input to this unit is the SYSTEM SELECT signal from the data processor. The two outputs from the refresh control circuit which are extended to the memory are the MODE and REFRESH signals. Of course, while the refresh control circuit 26 is shown as a separate element, it is to be understood that in actual practice it could be part of the overall interface unit. It is shown as a separate element in FIG. 5 only because the operation of that part of the interface unit represented by block 22 is most conveniently considered separate and apart from the refresh control circuit.

Figure 7:
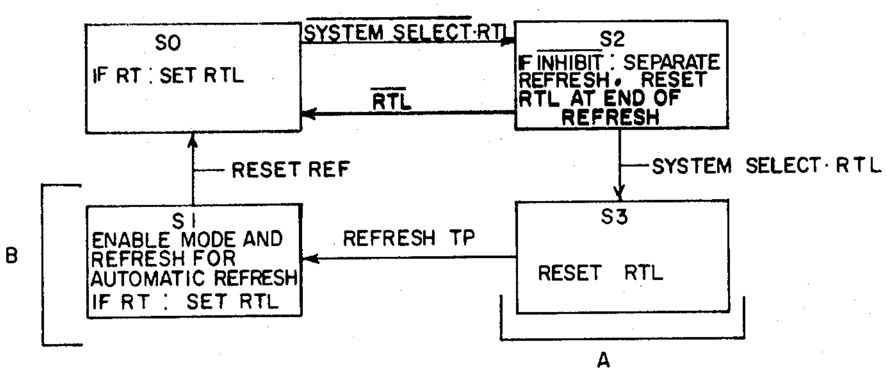
FIG. 7 is a state diagram which will be helpful in understanding the operation of refresh control circuit 26 of FIG. 5.

The state diagram of FIG. 7 depicts the refresh circuit control operation. The system can be in any one of four states, S0, S1, S2 and S3, and two flip-flops — A and B — are provided for defining the four states. As shown on FIG. 7, when both flip-flops are in the 0 state the system is in state S0, when both flip-flops are in the 1 state the system is in state S3, when only flip-flop A is in the 1 state the system is in state S2, and when only flip-flop B is in the 1 state the system is in state S1.

The system includes a counter which generates a "refresh time" (RT) pulse every 4.5 microseconds. The presence of this pulse is an indication that the memory has not been refreshed for several microseconds; the RT pulse always occurs prior to the maximum unrefreshed time interval of approximately 6.5 microseconds having elapsed. As shown in FIG. 7, when the system is in state S0 and the RT pulse is generated, the RTL latch is set to indicate that a refresh operation should take place as soon as possible.

If a SYSTEM SELECT pulse is in progress when the RTL latch is set, the system remains in state S0. It is only after the SYSTEM SELECT pulse has terminated, as symbolized by the notation $\overline{\text{SYSTEM SELECT}}$, together with the RTL latch being set, that the system switches to state S2. But simply because the system is switched to state S2 does not mean that a refresh operation takes place immediately. For example, suppose that the RT pulse was generated and the RTL latch was set shortly after a SYSTEM SELECT pulse terminated. While the refresh circuit is switched to state S2 at the end of the SYSTEM SELECT pulse, a memory cycle is still in progress and it is hardly possible to impose a refresh operation upon the memory. The refresh circuit generates a one-microsecond INHIBIT pulse starting with the leading edge of each SYSTEM SELECT pulse. If a SYSTEM SELECT pulse has been generated, a separate refresh operation should not take place for 1-microsecond — as will be described below, a separate refresh operation within 1-microsecond of the leading edge of a SYSTEM SELECT pulse can interfere with the memory timing. In the absence of the INHIBIT signal, as indicated by the notation $\overline{\text{INHIBIT}}$ in the box representing state S2 in FIG. 7, a separate refresh operation takes place because the memory is not in use. At the end of the refresh operation, the RTL latch is reset and the resetting of the latch ($\overline{\text{RTL}}$) returns the refresh circuit to the "waiting" state S0. Thus system state S2 controls either an immediate separate refresh cycle ("rule" 1 above), or a delayed separate refresh cycle ("rule" 3 above).

If 1 microsecond elapses after receipt of a SYSTEM SELECT pulse, the INHIBIT signal goes low and a separate refresh operation can take place. However, if another SYSTEM SELECT pulse is received before the one microsecond inhibit interval has elapsed, the receipt of that pulse, together with the RTL latch being set, switches the system to system state S3. Similarly, even if a separate refresh cycle has been initiated, since the RTL latch is not reset until the end of the cycle the receipt of a SYSTEM SELECT pulse switches the system to system state S3. State S3 is an intermediate state in which the RTL latch is reset. Although the latch is ordinarily reset only after a refresh operation has taken place, since the refresh operation will now surely take place, the RTL latch can be reset in advance. The refresh timing pulse (REFRESH TP) is generated 350 nanoseconds after the start of the SYSTEM SELECT pulse which first switches the system to state S3, and the REFRESH TP pulse switches the system to state S1. In this state, the MODE conductor goes high in potential and the REFRESH conductor goes low in potential. With these signals on the two conductors, an automatic refresh cycle takes place. At the end of the cycle a "reset refresh" (RESET REF) pulse is generated and the system is returned to state S0, the waiting state. In state S2 a separate refresh cycle is made to occur. Even if a read or write operation is in progress when state S2 is entered, it may be too late in the cycle for the memory to be switched to the automatic mode. But state S1 is entered just before the write portion of an overall cycle occurs, so the memory can be operated in the automatic mode with assurance that the refresh function will be accomplished. It is because a refresh operation may have to be performed during the second half of an overall cycle that the CLOCK signal always goes low (see FIG. 6) — even if a write operation is not to be performed. System state S1 controls the function described above as "rule" 2.

It is of interest to note the maximum time interval which may elapse before the memory is refreshed following the generation of an RT pulse. If the RT pulse is generated just after the start of a SYSTEM SELECT pulse, the system enters state S2 at the end of the pulse. One microsecond after the start of the pulse, a separate refresh operation is initiated. But suppose that just before the end of the 200-nanosecond refresh operation another SYSTEM SELECT pulse is received (i.e., just slightly short of 1.2 microseconds after the leading edge of the first SYSTEM SELECT pulse). The refresh operation is interrupted and the system cycles through state S3 to state S1. Referring to FIG. 6, the second CLOCK pulse during the overall cycle does not occur until 450 nanoseconds after the leading edge of the SYSTEM SELECT pulse. Thus the automatic mode cycle during which the refresh operation takes place does not begin until 1.65 microseconds after the generation of the RT pulse. Since the memory is refreshed toward the end of the 400-nanosecond cycle, slightly more than 2 microseconds may elapse following an RT pulse before the memory is actually refreshed, or slightly more than 6.5 microseconds may elapse following the last refresh operation. This maximum interval is still not sufficient for there to be any loss of memory data.

Since RT pulses are separated by 4.5 microseconds, an RT pulse cannot possibly be generated while the system is in state S1. The legend "IF RT: SET RTL" in box S1 of FIG. 7 represents an impossible situation. However, the circuit is designed so that the setting of the RTL latch by the RT pulse is under control of flip-flop A (when it is in the 0 state) because this simplifies the control circuit. Thus the legend is included in box S1 of FIG. 7 even though the situation to which it is directed cannot occur in practice.

As seen in FIG. 6, the CLOCK signal first goes low 100 nanoseconds after the leading edge of the SYSTEM SELECT pulse. The reason for this can be appreciated with reference to FIG. 4. It will be recalled that in the event a separate refresh operation is interrupted, the CLOCK and SELECT signals transmitted to the memory must be delayed for at least 50 nanoseconds to allow the memory circuits to recover. The 100-nanosecond delay before the actual read or write cycle begins is more than sufficient to allow the memory to recover from the interrupted refresh operation.

Figure 8:
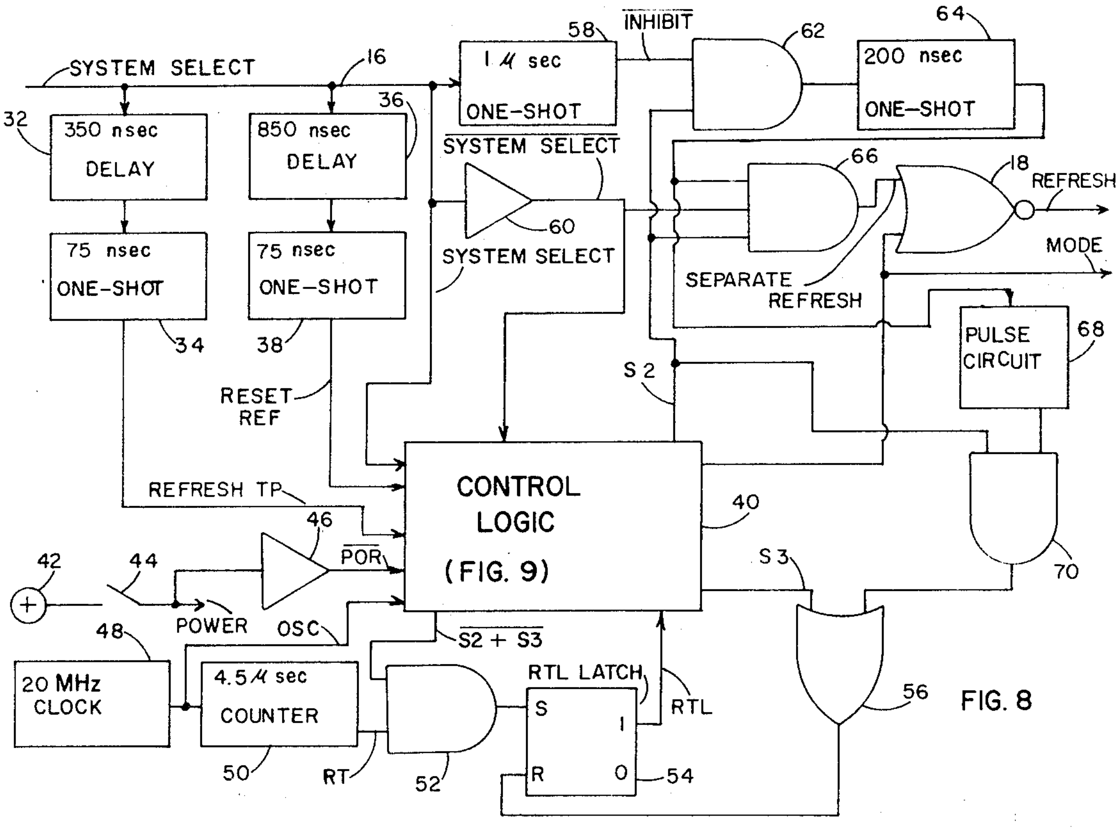
FIG. 8 is a schematic diagram of the refresh control circuit, in which the control logic thereof is shown in block diagram form.

Referring to FIG. 8, 20-MHz clock 48 extends timing pulses to the input of 4.5-microsecond counter 50. The counter generates an RT pulse and extends it to one input of gate 52 every 4.5 microseconds. The clock also extends pulses on conductor OSC to the control logic (FIG. 9), the clock pulses serving to control the switching of flip-flops A and B as will be described. As described above, when the system is in either of states S0 or S1, the generation of an RT pulse should set latch RTL. Output conductor $\overline{S2 + S3}$ is high when the system is in state S0 or S1 to enable the operation of gate 52 so that RTL latch 54 can be set. The 1 output of the latch goes high to energize the RTL conductor which is extended to the control logic.

The SYSTEM SELECT pulse is extended to the input of 1-microsecond one-shot multivibrator 58. The $\overline{\text{INHIBIT}}$ output of the multivibrator is low for 1-microsecond after the leading edge of the SYSTEM SELECT pulse. It is only after 1-microsecond has elapsed following the leading edge of a SYSTEM SELECT pulse that gate 62 is enabled. If the system is in state S2 at that time and conductor S2 is high, gate 62 operates to trigger 200-nanosecond one-shot multivibrator 64. Referring to FIG. 7, it is seen that in state S2 a separate refresh operation should take place if the $\overline{\text{INHIBIT}}$ signal is high — provided that a SYSTEM SELECT pulse is not generated, because if such a pulse is generated while the RTL latch is set the separate refresh pulse must be terminated and the system must switch to state S3. The output of multivibrator 64 is extended to one input of gate 66. A second input of this gate is connected to conductor S2 which is high when the system is in state S2. The third input to the gate is $\overline{\text{SYSTEM SELECT}}$ (derived by inverter 60) which is high in the absence of a SYSTEM SELECT pulse. Consequently, gate 66 operates to energize one input of NOR gate 18 to cause the REFRESH conductor to go low. This is all that is required to control a separate refresh operation. Referring to FIG. 3, it will be recalled that if a separate refresh cycle is to occur, the REFRESH conductor must go low for 200 nanoseconds, but it mut do so no earlier than 550 nanoseconds after the CLOCK signal last went low. Referring to FIG. 6, it is seen that following the generation of a SYSTEM SELECT pulse, the CLOCK signal goes low 450 nanoseconds after the leading edge of the pulse. Consequently, following the generation of a SYSTEM SELECT pulse, the separate refresh operation should not start until after 450 + 550, or 1,000 nanoseconds have elapsed. This is the reason for the provision of one-shot multivibrator 58 — 200-nanosecond multivibrator 64 cannot be triggered until 1-microsecond has elapsed following the leading edge of the last SYSTEM SELECT pulse.

Pulse circuit 68 detects the trailing edge of the 200-nanosecond pulse and energizes one input of gate 70. Provided the system is in state S2 at the end of the 200-nanosecond pulse (that is, it has not been switched to state S3 with the receipt of a SYSTEM SELECT pulse), one input of gate 56 is energized and the RTL latch is reset. As indicated in FIG. 7 when the system is in the state S2, the RTL latch should be reset at the end of the refresh pulse. Also as indicated in FIG. 7 when the system is in state S3, the RTL latch should be reset. When in this state, conductor S3 is energized so that gate 56 operates to reset the latch.

As shown in FIG. 7, the system can be placed in state S3 only upon receipt of a SYSTEM SELECT pulse while the RTL latch is set. While in this state the RTL latch is reset, and then the REFRESH TP pulse is generated to switch the system to state S1. The REFRESH TP pulse is generated a predetermined time after the leading edge of the SYSTEM SELECT pulse so that, if the system is in state S3, it will be switched to state S1. As shown in FIG. 8, the SYSTEM SELECT pulse is extended through 350-nanosecond delay element 32 so that multivibrator 34 is triggered 350 nanoseconds after receipt of the SYSTEM SELECT pulse. Although one-shot multivibrator 34 has a period of 75 nanoseconds, the width of the pulse is not important. It is the leading edge of the pulse, which occurs 350 nanoseconds after the leading edge of the SYSTEM SELECT pulse, which results in the extension of a REFRESH TP pulse to the control logic. The pulse is used to switch the system to state S1 at a time before the CLOCK signal goes low for the second time during the overall cycle (see FIG. 6).

Figure 9:
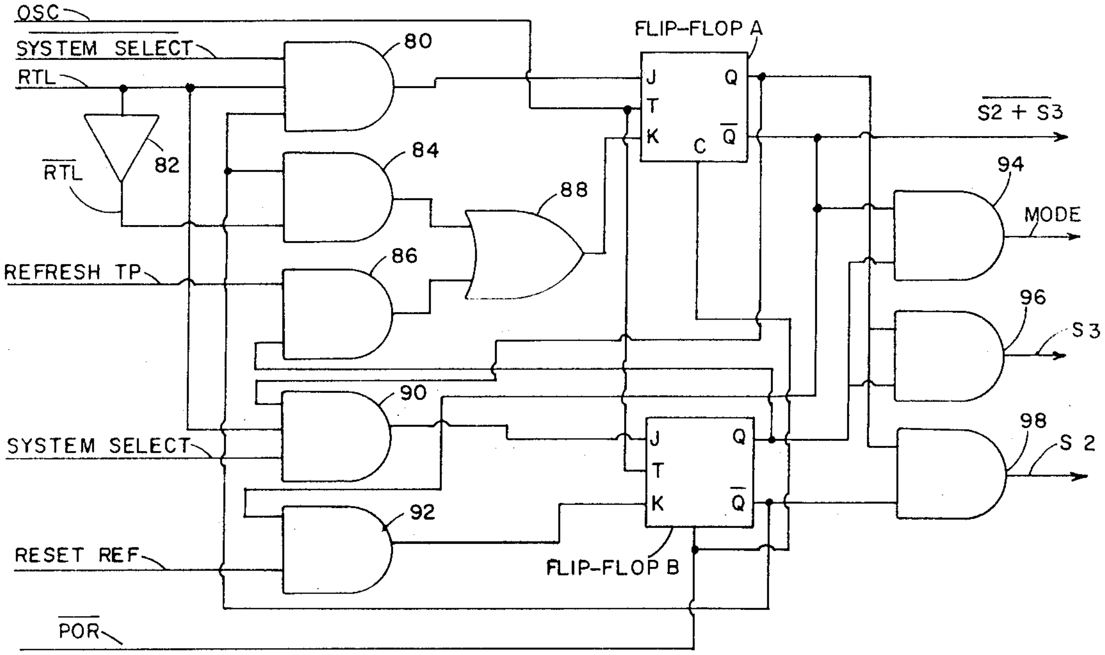
FIG. 9 is a schematic drawing of the control logic block of FIG. 8.

As will be described with reference to FIG. 9, when the system is switched to state S1, the MODE and REFRESH conductors go high and low in potential respectively to control an automatic refresh cycle. In order to switch the system back to state S0, as shown in FIG. 7 a RESET REF pulse must be generated. This pulse is generated only after the automatic refresh cycle has taken place. Referring to FIG. 6, the write part of each overall cycle begins 450 nanoseconds after the leading edge of the SYSTEM SELECT pulse. Referring to FIG. 1, an automatic refresh cycle requires 400 nanoseconds. Thus the automatic refresh cycle is completed 850 nanoseconds after the leading edge of the SYSTEM SELECT pulse. The SYSTEM SELECT pulse on conductor 16 is extended through 850-nanosecond delay element 36 to 75-nanosecond one-shot multivibrator 38. The multivibrator generates the RESET REF pulse at the end of the automatic refresh cycle. The precise width of the pulse is unimportant since it is the leading edge which causes the system to switch from state S1 to state S0.

Although the RESET REF pulse is not generated until 850 nanoseconds after the leading edge of the SYSTEM SELECT pulse, the data processor may extend SYSTEM SELECT pulses to the interface with a minimum spacing of only 800 nanoseconds. It is thus possible that the refresh circuit will not be switched back to state S0 until 50 nanoseconds after a second SYSTEM SELECT pulse is received. However, this is of no moment because there is no critical time relationship between receipt of a SYSTEM SELECT pulse and the entry by the system into state S0.

All of the circuits thus far described with reference to FIG. 8 control the operations which occur while the system is in particular ones of the four states. The actual switch from one state to another is governed by the control logic of FIG. 9. The only other input to the control logic not described thus far is the $\overline{POR}$ conductor. Switch 44, when first closed, connects source 42 to the POWER line which turns on the entire system. The signal is inverted by inverter 46 so that conductor $\overline{POR}$ goes low. The negative step applied over conductor $\overline{POR}$ to the clear (C) input of each of flip-flops A and B (FIG. 9) resets them and the respective $\overline{Q}$ outputs go high. Whenever conductor OSC goes negative, the toggle (T) input of each flip-flop is energized and each flip-flop can change state depending upon the polarities of the signals applied to the respective J and K inputs. The OSC pulses occur at such a fast rate that the flip-flops change state almost immediately upon a change in the polarities of the signals at their J and K inputs. If both inputs are low, the flip-flop does not change state, and if both inputs are high the flip-flop switches state. If only the J input is high the flip-flop is set in the 1 state with the Q output going high, and if only the K input is high the flip-flop is reset with the Q output going high. With both flip-flops initially reset, the system is in state S0. Conductor S2 + S3 is high (as it is when the system is in state S1).

When the system is in state S3, that is, when the Q outputs of both flip-flops are high, both inputs of gate 96 are enabled and conductor S3 is energized. When the system is in state S2, the Q output of flip-flop A is energized and the $\overline{Q}$ output of flip-flop B is energized, both inputs of gate 98 are enabled and conductor S2 is energized. When the system is in state S1, the Q output of flip-flop B is high and the Q output of flip-flop A is high; both inputs of gate 94 are enabled and the MODE conductor is energized. It will be recalled that in state S1 an automatic refresh operation takes place. This requires that the MODE conductor go high and the refresh conductor go low. Referring to FIG. 8, it is seen that the MODE conductor is extended directly to the memory. It is also extended through NOR gate 18 to cause the REFRESH conductor to go low.

With the system in state S0, gate 92 is enabled since one of its inputs is connected to the energized $\overline{Q}$ output of flip-flop A. Even if the gate operates, however, with the application of a RESET REF pulse, the system state does not change; gate 90 cannot operate because it is connected to the Q output flip-flop A which is low. Consequently, the J input of flip-flop B is low, and even if the K input goes high these relative polarities are those which cause flip-flop B to be reset — which it is already when the system is in state S0.

Gate 86 is not enabled in state S0 because it is connected to the Q output of flip-flop B which is low. However, the $\overline{Q}$ output of flip-flop B, which is high, is connected to one input of each of gates 80 and 84. If the $\overline{\text{SYSTEM SELECT}}$ input is high and the RTL input is high at the same time, then gate 80 operates. Since inverter 82 causes the $\overline{RTL}$ input to gate 84 to be low, gate 84 does not operate. Consequently, the J input of flip-flop A goes high while the K input remains low. This causes flip-flop A to switch to the 1 state, and the system state to switch from state S0 to state S2. Referring to FIG. 7, this is the required action when a SYSTEM SELECT pulse is not present but the RTL latch has been set. On the other hand, if the RTL input is low when the system is in state S2, conductor $\overline{RTL}$ is high. Since in state S2 the $\overline{Q}$ output of flip-flop B is also high to enable the second input of gate 84, gate 84 operates to causes the output of gate 88 to go high. With the J input of flip-flop A low and the K input high, flip-flop A is reset so that the system switches back to state S0 from state S2, as required by the system state diagram of FIG. 7.

The RTL and SYSTEM SELECT signals are extended to two of the inputs of gate 90. The third input to the gate is connected to the Q output of flip-flop A. Consequently, gate 90 can operate if flip-flop A is in the 1 state, that is, when the system is in either of states S2 or S3. When the system is in state S2, The $\overline{Q}$ output of flip-flop A is low so that gate 92 is disabled. Consequently, the K input of flip-flop B is low but the J input of flip-flop B can go high upon receipt of RTL and SYSTEM SELECT signals. At this time, flip-flop B switches to the 1 state so that the system enters state S3; as shown in FIG. 7, if SYSTEM SELECT and RTL signals are present while the system is in state S2, then the system should switch to state S3. (As described above in connection with FIG. 8, with conductor S3 going high at this time the RTL latch is reset.) The fact that gate 90 is controlled only by the Q output of flip-flop A, that is, it is enabled when the system is in state S3 as well as state S2, is of no moment because this could only allow flip-flop B to switch to the 0 state if gate 92 operates together with gate 90 and this is impossible because respective ones of their inputs are connected to different outputs of flip-flop A.

With the system in state S3, the Q output of flip-flop B is high and gate 86 is enabled. When a REFRESH TP signal is received, gate 86 operates and a signal is transmitted through OR gate 88 to the K input of flip-flop A. At the same time, since the $\overline{Q}$ output of flip-flop B is low, gate 80 is disabled so that the J input of flip-flop A is low. Flip-flop A thus switches to the 0 state so that the system switches from state S3 to state S1. Although the operation of gate 86 is controlled only by the Q output of flip-flop B, and gate 86 can therefore operate when the system is in state S1 as well as state S3, this if of no moment because it would allow flip-flop A to switch back to the 1 state only if gate 80 causes the J input of flip-flop A to go high together with the K input, and this cannot happen because the RTL input of gate 80 is low while the system is in state S1.

When the system is in state S1, the $\overline{Q}$ output of flip-flop A is high to energize one input of gate 92. When the RESET REF pulse is received, gate 92 operates to energize the K input of flip-flop B. At this time, gate 90 is disabled because one of its inputs is connected to the Q output of flip-flop A which is low. Consequently, flip-flop B switches to the 0 state so that the overall system switches to state S0. Gate 92 is controlled only by the $\overline{Q}$ output of flip-flop A, even though this output is also high when the system is in state S0, because flip-flop B could be switched back to the 1 state while gate 92 is operated only if gate 90 operates at the same time; this is impossible since gates 90 and 92 are enabled by different ones of the outputs of flip-flop A.

Although the invention has been described with reference to a particular embodiment, it is to be understood that this embodiment is merely illustrative of the application of the principles of the invention. Numerous modifications may be made therein and other arrangments may be devised without departing from the spirit and scope of the invention.

What is claimed is:

1. A circuit for controlling refresh operations of a dynamic MOS add-on memory used in conjunction with a data processor, said add-on memory being operative in an automatic mode in which the memory is refreshed automatically at the end of a read or write cycle and being further operative in a separate refresh mode in which the memory is refreshed during a separate refresh cycle without a read or write operation being performed during the cycle, comprising clock means for generating periodic clock pulses indicative of a need for the memory to be refreshed, means responsive to the memory not having executed a read or write cycle for a predetermined time interval when a clock is pulse is generated for controlling the immediate execution of a separate refresh cycle, means responsive to the memory either executing a read or write cycle or having terminated the execution of such a cycle within said predetermined time interval when a clock pulse is generated for controlling the execution of a separate refresh cycle upon the termination of said predetermined time interval following the last read or write cycle, and means responsive to a command from said data processor to execute a read or write operation for interrupting a separate refresh cycle if such a cycle is in progress and for controlling said memory to operate in said automatic mode.

2. A circuit for controlling refresh operations of a dynamic MOS add-on memory used in conjunction with a data processor in accordance with claim 1 further including means for generating timing signals, bistable means for defining one of a pluarlity of system states, means for switching said bistable means from defining one system state to define another system state in accordance with respective generated timing signals and signals received from said data processor while said bistable means define said one system state, and means for controlling refresh operations in accordance with generated timing signals while said bistable means define respective system states.

3. A circuit for controlling refresh operations of a dynamic MOS add-on memory used in conjunction with a data processor in accordance with claim 2 wherein said clock pulses are generated at intervals short enough to ensure the refreshing of said memory at intervals shorter than a predetermined value.

4. A circuit for controlling refresh operations of a dynamic MOS add-on memory used in conjunction with a data processor in accordance with claim 2 wherein said data processor initiates a read or write operation with the generation of a system select pulse, and refresh operations are controlled to occur at times determined only by the times of occurrence of system select pulses and generated clock pulses.

5. A circuit for controlling refresh operations of a dynamic MOS add-on memory used in conjunction with a data processor in accordance with claim 1 wherein said data processor initiates a read or write operation with the generation of a system select pulse, and refresh operations are controlled to occur at times determined only by the times of occurrence of system select pulses and generated clock pulses.

6. A circuit for controlling refresh operations of a dynamic MOS memory used as an add-on memory for a data processor, said memory being operative in a first mode in which it is refreshed at the end of a read or write cycle and being further operative in a second mode in which it is refreshed during a separate refresh cycle without a read or write operation being performed during the cycle, comprising means for generating a pulse indicative of a need for the memory to be refreshed, means responsive to the generation of a pulse for operating the memory in said second mode in accordance with the time when a previous read or write operation was performed, and means responsive to a command from said data processor to execute a read or write operation for interrupting the operation of the memory in said second mode and for controlling the memory to operate in said first mode.

7. A circuit for controlling refresh operations of a dynamic MOS memory used as an add-on memory for a data processor in accordance with claim 6 further including means for generating timing signals, bistable means for defining one of a plurality of system states, means for switching said bistable means from defining one system state to define another system state in accordance with respective generated timing signals and signals received from said data processor while said bistable means define said one system state, and means for controlling refresh operations in accordance with generated timing signals while said bistable means define respective system states.

8. A circuit for controlling refresh operations of a dynamic MOS memory used as an add-on memory for a data processor in accordance with claim 7 wherein said pulses are generated at intervals short enough to ensure the refreshing of said memory at intervals shorter than a predetermined value.

9. A circuit for controlling refresh operations of a dynamic MOS memory used as an add-on memory for a data processor in accordance with claim 7 wherein said data processor initiates a read or write operation with the generation of a system select pulse, and refresh operations are controlled to occur at times determined only by the times of occurrence of system select pulses and said generated pulses.

10. A circuit for controlling refresh operations of a dynamic MOS memory used as an add-on memory for a data processor in accordance with claim 6 wherein said data processor initiates a read or write operation with the generation of a system select pulse, and refresh operations are controlled to occur at times determined only by the times of occurrence of system select pulses and said generated pulses.

* * * * *